(12) United States Patent
Knight, Sr. et al.

(10) Patent No.: US 8,813,408 B1
(45) Date of Patent: Aug. 26, 2014

(54) GUN STOCK RETAINER, INCLINED SEAT PAD, AND KNEE MOUNTABLE GUN REST FOR A SHOOTING GARMENT

(71) Applicants: Russell Knight, Sr., Nashville, TN (US); Russell Knight, Jr., Nashville, TN (US)

(72) Inventors: Russell Knight, Sr., Nashville, TN (US); Russell Knight, Jr., Nashville, TN (US)

( * ) Notice: Subject to any disclaimer, the term of this patent is extended or adjusted under 35 U.S.C. 154(b) by 0 days.

(21) Appl. No.: 13/934,943

(22) Filed: Jul. 3, 2013

Related U.S. Application Data

(63) Continuation of application No. 13/761,204, filed on Feb. 7, 2013.

(60) Provisional application No. 61/595,775, filed on Feb. 7, 2012.

(51) Int. Cl.
*F16M 13/04* (2006.01)
*F41C 33/00* (2006.01)
*F41C 23/02* (2006.01)

(52) U.S. Cl.
CPC .............. *F16M 13/04* (2013.01); *F41C 33/001* (2013.01); *F41C 23/02* (2013.01)
USPC .............................................. 42/94; 224/149

(58) Field of Classification Search
CPC .... F41C 33/003; F41C 33/005; F41C 33/002; F41C 33/001; Y10S 224/913; F16M 13/04
USPC ................... 42/94, 71.01; 224/149; 2/94, 459
See application file for complete search history.

(56) References Cited

U.S. PATENT DOCUMENTS

| | | | |
|---|---|---|---|
| 4,243,165 A * | 1/1981 | Schuler | 224/149 |
| 5,687,422 A | 11/1997 | Wurst et al. | |
| 8,051,596 B1 * | 11/2011 | Thomas, Jr. | 42/94 |
| 8,056,778 B1 * | 11/2011 | Michaux | 224/149 |
| 2002/0036219 A1 * | 3/2002 | Neighbors | 224/149 |
| 2008/0086928 A1 * | 4/2008 | Pereksta | 42/94 |
| 2010/0051656 A1 * | 3/2010 | McCarty et al. | 224/149 |

* cited by examiner

*Primary Examiner* — Samir Abdosh
*Assistant Examiner* — John D Cooper
(74) *Attorney, Agent, or Firm* — Waddey Patterson; Mark A. Pitchford

(57) ABSTRACT

A gun stock retainer, a gun rest operable to mount on a human knee, and an inclined seat pad may be used separately or included in a single garment (e.g., a hunting vest). The gun stock retainer includes an opening in a base material and a retaining strap including a nonslip material operable to engage the stock and pull the stock into the base material and the opening. The gun rest includes a knee cup shaped to conform to a front of a wearer's knee, a knee strap to hold the knee cup to the wearer's knee, and a cradle attached to the knee cup and sized to receive a fore-end of a gun. The inclined seat pad is generally wedge-shaped and is attached or releasably attached to a back portion of fabric of the garment via a hinge.

9 Claims, 8 Drawing Sheets

US 8,813,408 B1

GUN STOCK RETAINER, INCLINED SEAT PAD, AND KNEE MOUNTABLE GUN REST FOR A SHOOTING GARMENT

CROSS-REFERENCES TO RELATED APPLICATIONS

This application claims priority to and incorporates by reference in its entirety U.S. patent application Ser. No. 13/761,204 entitled "GUN STOCK RETAINER, INCLINED SEAT PAD, AND KNEE MOUNTABLE GUN REST FOR A SHOOTING GARMENT" filed Feb. 7, 2013 which claims priority to and incorporates by reference in its entirety U.S. Provisional Patent Application Ser. No. 61/595,775 entitled "GUN STOCK RETAINER, INCLINED SEAT PAD, AND KNEE MOUNTABLE GUN REST FOR A SHOOTING GARMENT" filed Feb. 7, 2012.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO SEQUENCE LISTING OR COMPUTER PROGRAM LISTING APPENDIX

Not applicable.

BACKGROUND OF THE INVENTION

One problem shooters (e.g., hunters, sharpshooters, police, and military personnel) face is keeping a weapon at the ready (e.g. shouldered) for long periods of time. For example, a hunter may need to keep a rifle or shotgun shouldered for a long period of time while waiting for a target (e.g. a game animal). Similarly, sharpshooters may need to keep a rifle shouldered for long period of time while observing a potential target. A shooter may need to eat, drink, operate a game call, communicate via an electronic device, reposition some piece of equipment, or reposition himself. All of these activities require the shooter to take his hands off of the gun which, traditionally, means putting the gun down. That is, the shooter must lay the gun on the ground or lay the gun in his lap to complete the activity. Thus, shooters are frequently not ready to shoot when necessary. For example, a hunter will often have his gun in his lap or laying beside him while operating a game call when a game animal comes into view. The hunter must then scramble for his gun which will typically cause the game animal to flush (i.e., run or fly so as to avoid the hunter) resulting in the hunter missing the game animal or completely missing the opportunity to shoot at the game animal.

Further, comfort is a major factor in how long a shooter can maintain a weapon at the ready. For ground hunters (e.g., turkey hunters), the shooter (i.e. hunter) will typically place decoys in a clearing and sit in cover (e.g., in the woods) while calling game. Typically, the shooter will sit at the base of a tree and lean against the tree. However, because the base of the tree is at an incline, the shooter will tend to slide down the tree which puts the shooter in an uncomfortable position. Thus, the shooter must frequently reposition himself which often results in noises and motions that scare game animals and may prevent the shooter from being able to successfully harvest his prey.

BRIEF SUMMARY OF THE INVENTION

This invention relates generally to garments or equipment for hunting and/or shooting. More particularly, the invention relates to a gun stock retainer, a gun rest operable to mount on a human knee, and an inclined seat pad that may be used separately or included in a single garment.

In one aspect, a gun stock retainer operable to hold a stock of the gun includes a base material and a retaining strap. The base material has an opening operable to receive a butt of the stock of the gun. The retaining strap includes a nonslip material operable to contact the stock when the gun stock retainer is holding the stock. The retaining strap is operable to engage the top of the stock of the gun and pull the butt of the stock into the opening when the gun stock retainer is holding stock.

In another aspect, a gun rest operable to mount on a human knee and hold a fore-end of the gun includes a knee cup, and knee strap, and a cradle. The knee cup is generally shaped to conform to a front of the human knee. The knee cup has a concave face operable to face the human knee and a convex face operable to face out from the human knee. The knee strap is operable to attach to opposing edges of the knee cup, pass behind the human knee, and hold the knee cup to the front of the human knee. The cradle is sized to receive the fore-end of the gun and is affixed to the convex face of the knee cup near a center of the convex face of the knee cup.

In another aspect, a garment operable to be worn by a user includes a back portion of fabric, a seat pad, and a hinge. The back portion of fabric is near or below the waist of the wearer when the wearer is wearing the garment in an upright, standing position. The seat pad is generally wedge-shaped. The hinges between the back portion of fabric and the seat pad and is operable to attach a first edge of the seat pad to the back portion of fabric. The seat pad is thinner at the first edge than at a second edge of the seat pad opposite the first edge.

In another aspect, a garment operable to be worn by a wearer includes a gun stock retainer, a gun rest attachment point, a gun rest, a back portion of fabric, a seat pad, and a hinge. The gun stock retainer is operable to hold a stock of the gun, and includes a base material and a retaining strap. The base material has an opening operable to receive a butt of the stock of the gun. The retaining strap includes a nonslip material operable to contact the stock when the gun stock retainer is holding the stock. The retaining strap is operable to engage the top of the stock of the gun and pull the butt of the stock into the opening when the gun stock retainer is holding stock. The gun rest is operable to mount on a human knee and hold a fore-end of the gun and includes a knee cup, and knee strap, and a cradle. The knee cup is generally shaped to conform to a front of the human knee. The knee cup has a concave face operable to face the human knee and a convex face operable to face out from the human knee. The knee strap is operable to attach to opposing edges of the knee cup, pass behind the human knee, and hold the knee cup to the front of the human knee. The cradle is sized to receive the fore-end of the gun and is affixed to the convex face of the knee cup near a center of the convex face of the knee cup. The gun rest is releasably attached to the gun rest attachment point of the garment via an elastic cord. The back portion of fabric is near or below the waist of the wearer when the wearer is wearing the garment in an upright, standing position. The seat pad is generally wedge-shaped. The hinges between the back portion of fabric and the seat pad and is operable to attach a first edge of the seat pad to the back portion of fabric. The seat pad is thinner at the first edge than at a second edge of the seat pad opposite the first edge.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various drawings unless otherwise specified.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

Figure 1:
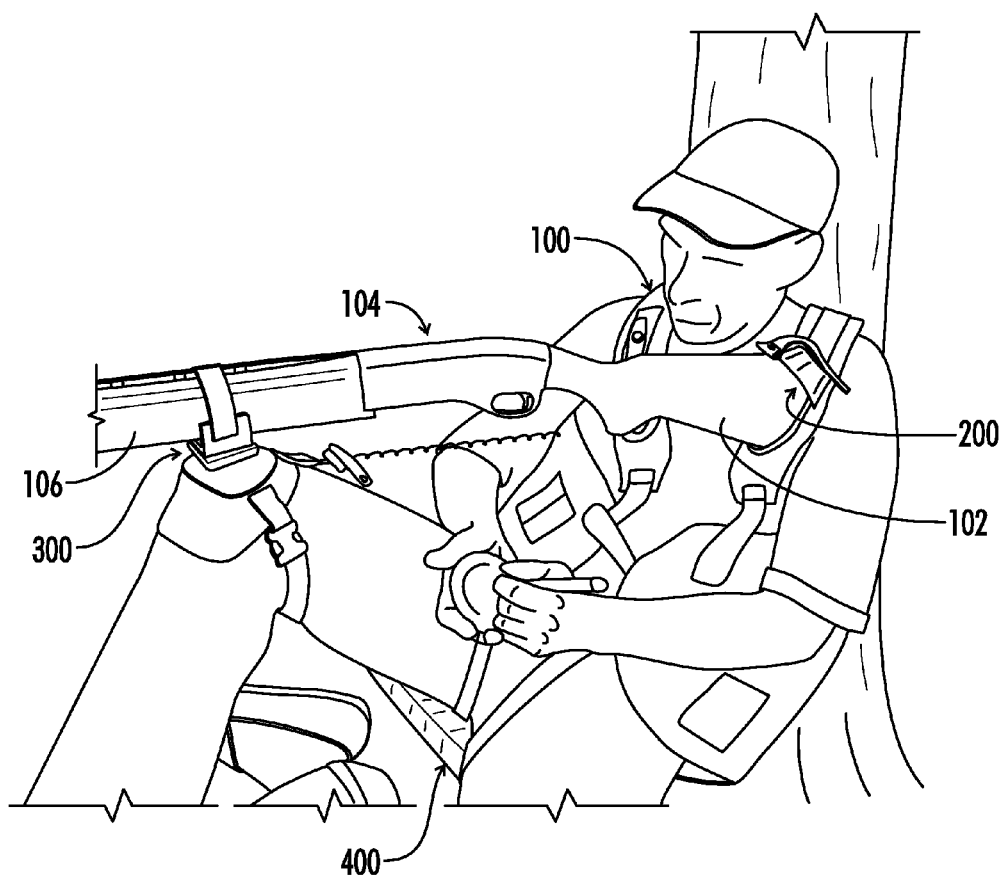
FIG. 1 is an elevated perspective view of a wearer wearing a garment with a universal gun stock retainer and a knee mountable gun rest mounted on the wearer's knee with the wearer in a seated position.

Referring to FIG. 1, a garment 100 includes a gun stock retainer 200, a gun rest 300, and a wedge-shaped seat pad 400. The gun stock retainer 200 is in a slightly reclined position and would be in an upright position if a wearer of the garment 100 were sitting up straight. The gun stock retainer 200 is shown holding the stock 102 of a gun 104. The gun rest 300 is shown mounted on a human knee (i.e., of a wearer of the garment 100) and holding a fore-end 106 of the gun 104. The seat pad 400 is shown with a hinge (not visible) in an open position such that the seat pad 400 extends under the buttocks of a wearer of the garment 100 who is in a seated position. The fore-end 106 of the gun 104 may also be referred to as a forearm, a forend, or a fore stock, and the stock 102 may also be referred to as a shoulder stock, a butt stock, or a butt. The gun 104 is thus fully held and supported by the garment 100, and the wearer of the garment 100 is able to use both hands for activities such as operating a game call, drinking, eating, or communicating via electronic communication device while maintaining the gun 104 on target in a ready to fire position. Further, the gun 104 may thus be aimed and fired with one hand which is beneficial for shooters having only one hand, and muzzle control is improved, enhancing safety which may be particularly beneficial for shooters such as youth hunters.

Figure 2:
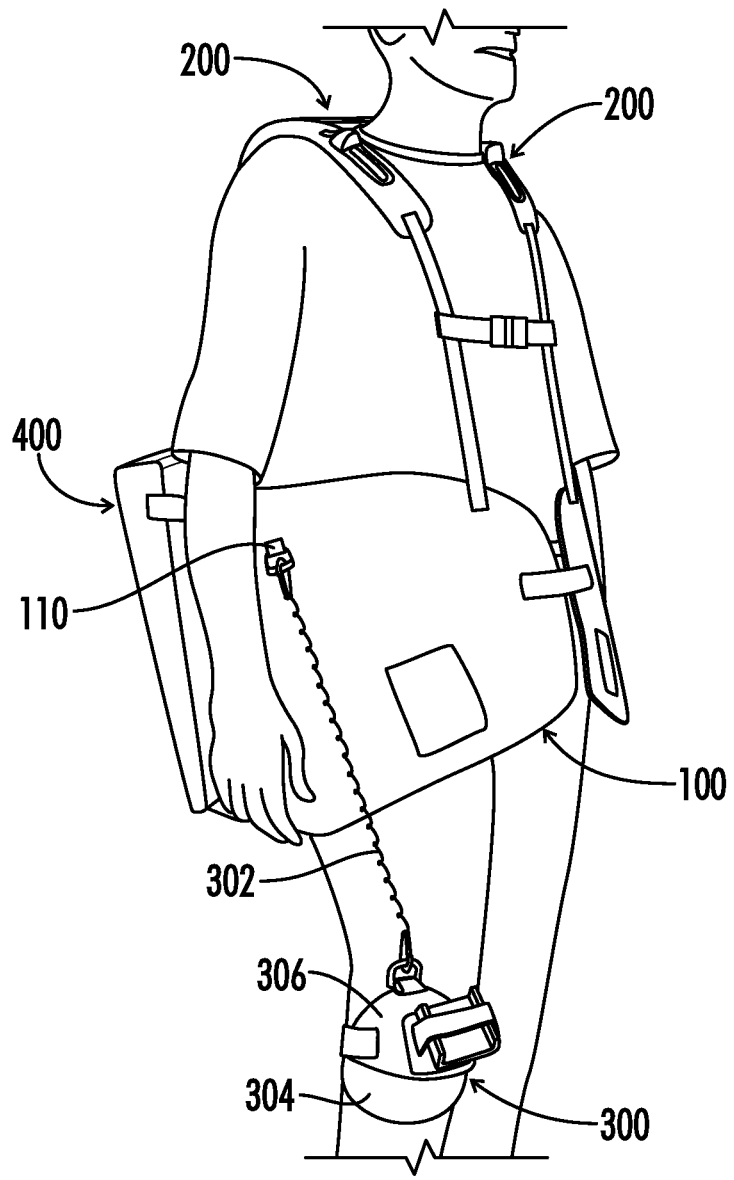
FIG. 2 is a perspective view of a wearer wearing a garment with a universal gun stock retainer and a knee mountable gun rest mounted on the wearer's knee with the wearer in a standing position.

Referring to FIG. 2, the garment 100 is on the wearer who is in a standing position. An elastic cord 302 releasably attaches the gun rest 302 to an attachment 110 of the garment 100. In one embodiment, the elastic cord 302 is attached to the attachment point 110 via a hook. The elastic cord 302 keeps the gun rest 300 with the garment 100 even when the wearer has removed the gun rest 300 from his knee and not stowed it in the garment 100. An elastic portion 304 spans a lower edge of the knee cup 306 of the gun rest 300 helps to hold the gun rest in place on the wearer's knee while enabling the wearer to stand and walk freely.

Figure 3:
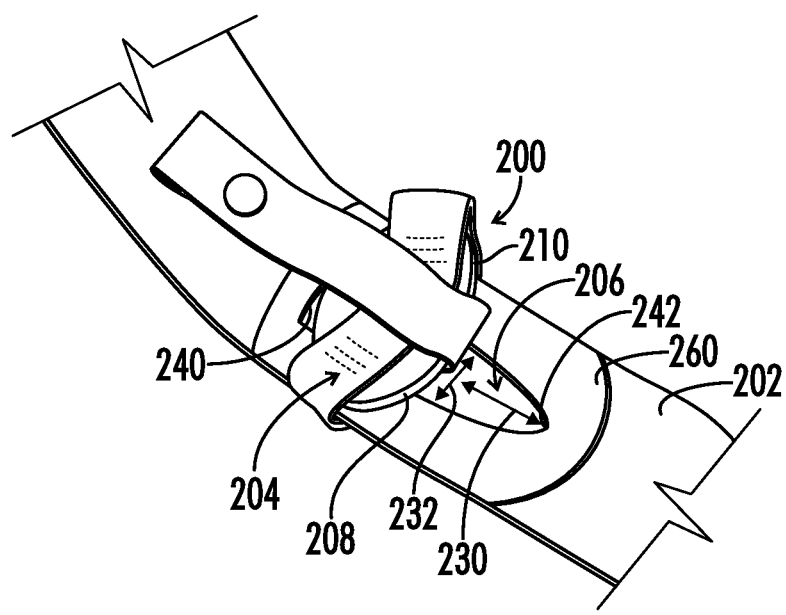
FIG. 3 is an elevated perspective view of a universal gun stock retainer with a base material of the universal gun stock retainer in a substantially horizontal position.
Figure 4:
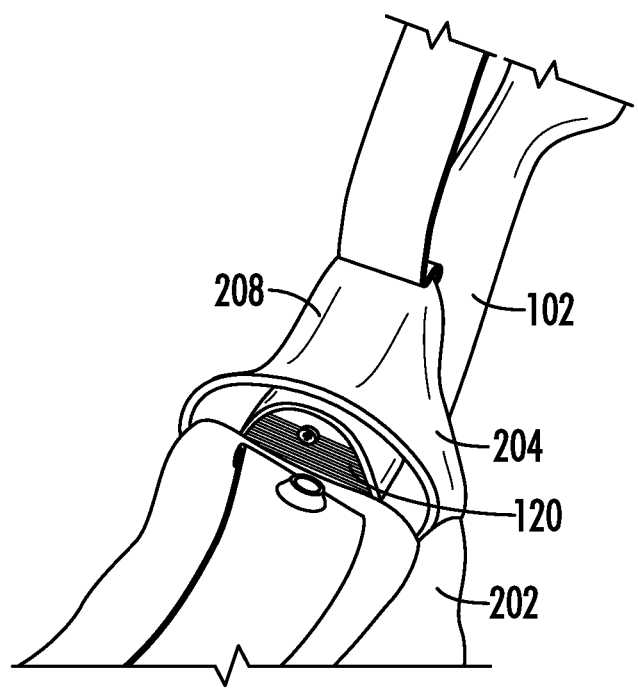
FIG. 4 is an elevated perspective view of a universal gun stock retainer retaining a gun stock having a portion of a base material of the gun stock retainer folded back to make a butt of the gun visible.
Figure 5:
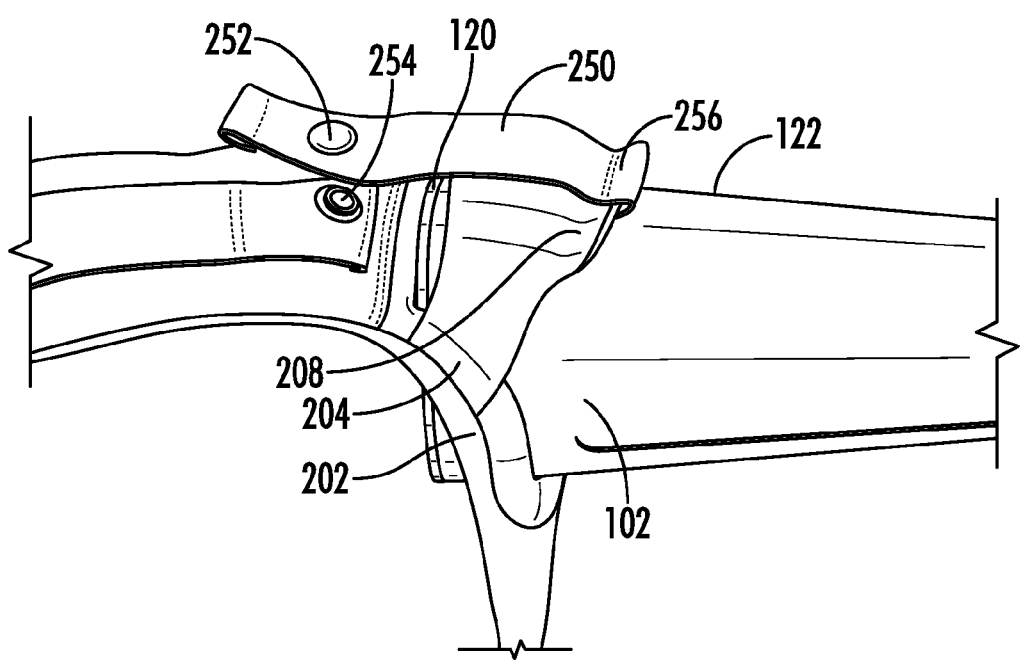
FIG. 5 is an elevated perspective side view of universal gun stock retainer retaining a gun stock.

Referring to FIGS. 3, 4, and 5, the gun stock retainer 200 includes a base material 202 and a retaining strap 204. The base material 202 includes an opening 206 operable to receive a butt 120 of the stock 102 of the gun 104. The retaining strap 204 includes a nonslip material 208 operable to contact the stock 102 when the gun stock retainer 200 is holding the stock 102. As shown in FIG. 5, the nonslip material 208 contacts a top 122 of the stock 102 and pulls the butt 120 into the opening 206 when the gun stock retainer 200 is holding stock 102. In one embodiment, the base material 202 is a fabric which may or may not be padded, and the base material 202 is part of a shoulder area of the garment 100. The shoulder area of the garment 100 is the area of the garment 100 that is at a front of a shoulder of the wearer of the garment 100 (i.e., where the wearer would typically place the butt 120 of the gun 104 to fire the gun 104).

In one embodiment, the retaining strap 204 is formed by integrating an elastic fabric in the polyurethane rubber (see, for example, FIG. 5), and the nonslip material 208 is the polyurethane rubber that substantially covers the retaining strap 204. This may be accomplished by calendaring or by coating the elastic fabric with the polyurethane rubber. In one embodiment, the elastic fabric is a nylon spandex blend.

In one embodiment, the nonslip material 208 is a nonslip pad 210, and the retaining strap 204 includes an elastic fabric that is not covered by polyurethane rubber (see, for example, FIG. 3). In this embodiment, the nonslip pad 210 is near a center of the elastic fabric such that the nonslip pad 210 contacts stock 102 when the gun stock retainer 200 is holding the stock 102. In one embodiment, the nonslip pad 210 contacts the top 122 stock 102 when the gun stock retainer 200 is holding the stock 102. It is also contemplated that the nonslip pad 210 may comprise to nonslip pads on either side of the center of the retaining strap 204 such that the nonslip pads contact sides of the stock 102 instead of the immediate top 122 of the stock 102.

Figure 9:
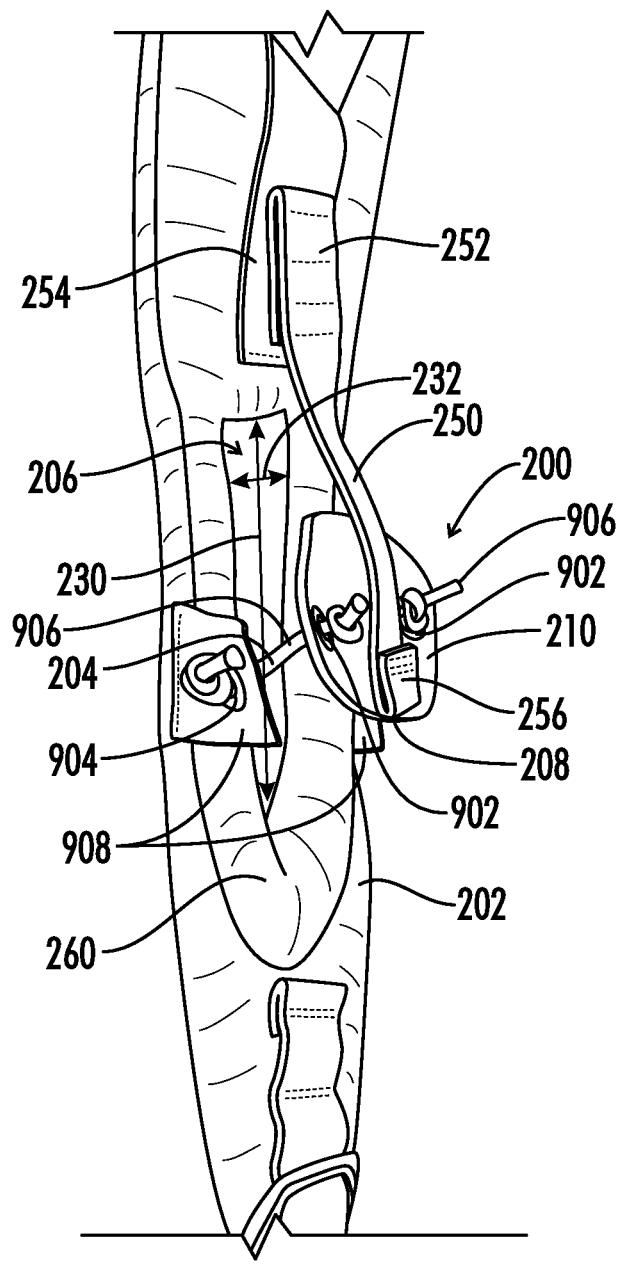
FIG. 9 is an elevated perspective view of a universal gun stock retainer in a substantially vertical position.

In one embodiment, the nonslip material 208 is a nonslip pad 210 having a pair of opposing holes 902 (see, for example, FIG. 9). Each hole 902 may include a metal eyelet to prevent tearing of the nonslip pad 210. Similarly, base material holes 904 in the base material 202 (or extensions 908 therefrom) may include eyelets to prevent tearing of the base material 202 or extension 904. In the embodiment of FIG. 9, the retaining strap 204 comprises a pair of elastic cord sections 906. Each elastic cord section 906 passes through one of the nonslip pad holes 902 and a corresponding base material hole 904 (or hole in an extension therefrom 908), and is knotted at each end. This retains the non-slip pad 210 in an elastic arrangement with the base material 202. Thus, if a backpack or vest is made with opening 206, base material holes 904 at the sides of the opening 206 (as shown in FIG. 9), and the corresponding fastener 254 to the fastener 252, the gun stock retainer may be made ambidextrous. That is, unknotting one end of each elastic cord section 906 and releasing the fastener 252 from the corresponding fastener 254 frees the nonslip pad 210, elastic cord sections 906, installation strap 250, and fastener 252 from the one strap, allowing the user to complete the gun stock retainer 200 on the other strap of the backpack or vest.

Generally, the gun stock retainer 200 is in an upright position when the base material 202 is substantially vertical. When the gun stock retainer 200 is in an upright position, a first dimension 230 of the opening 206 is substantially vertical, and a second dimension 232 of the opening 206 is substantially horizontal. Thus, the second dimension 232 is substantially co-planar with and perpendicular to the first dimension 230. In one embodiment, the first dimension 230 is greater than the second dimension 232. The first dimension is less than a vertical dimension of the butt 120. Generally, the vertical dimension of the butt 120 is a difference in elevation of a bottom of the butt 120 and a top of the butt 120 when the gun 104 is upright and in a substantially horizontal firing position (e.g., as shown in FIG. 1). In one embodiment, the first dimension 230 of the opening 206 is between one quarter and three quarters of the corresponding vertical dimension of the butt 120 (e.g., see FIG. 4). In one embodiment, the second dimension 232 is equal to or greater than a corresponding horizontal dimension of the butt 120. In one embodiment, a portion of an outline of the opening 206, excluding a top page 240 of the opening 206, substantially matches a corresponding portion of an outline of the butt 120.

The first end of the retaining strap 204 and a second end of the retaining strap 204 opposite the first end are attached to base material 202. The first end of the retaining strap 204 and the second end are separated by a distance at least as great as a width (e.g., the second dimension 232) of the opening 206. When the first end of the retaining strap 204 and the second end of the retaining strap 204 are separated by a distance greater than the width of the opening 206 the base material 202 is pulled up onto the sides of the stock 102 and wraps around the butt end of the stock 102 when the gun stock retainer 200 is holding the stock 102. This increases the stability of the gun in the gun stock retainer 200. Experimentation has shown that attaching the first and second ends of the retaining strap 204 to the base material 202 at about one half an inch from edges of the opening 204 results in optimal stability in when the gun stock retainer 200 is in a shoulder strap configuration with minimal deformation to the base material 22 such that if the gun stock retainer 200 were part of a jacket or coat, the gun stock retainer 200 would not unnecessarily pull on the jacket or coat making the coat uncomfortable for the wearer. In one embodiment, the base material 202 includes a trim ring 260 having a width of approximately one half inch, and the first and second ends of the retaining strap 204 are attached to the trim ring 260 at opposing outside edges of the trim ring 260. In one embodiment, the trim piece 260 includes a rubber insert. In one embodiment, the first and second ends of the retaining strap 204 are cut at an angle (e.g., 17°) with respect to a length dimension of the retaining strap 204 to enhance the contact and hold of the nonslip material 208 on the stock 102. Experimentation has shown that an angle of approximately 15-20° (e.g., 17°) between the base material 22 and the retaining strap 204 is optimal for retaining the butt 120 in the opening 206 and on the base material 202 above the opening 206. This results in an angle between the top 122 of the of the stock 102 and the retaining strap 204 of about 45° (and a corresponding angle of about 45° between the retaining strap 204 and vertical) due to the retaining strap 204 cupping a portion of the base material 202 around the end of the stock 102 when the gun stock retainer 200 is holding the stock 102.

In one embodiment, the first dimension 230 of the opening 206 is between half and three fourths of the corresponding vertical dimension of the butt 120 of the stock 102 of the gun 104, and the first end and the second end of the retaining strap 204 are attached to the base material 202 at or below the top edge 240 of the opening 206 when the base material 202 is upright. In another embodiment, the first dimension to 30 of the opening 206 is between one fourth and half of the corresponding vertical dimension of the butt 120, and the first and second ends of the retaining strap 204 are attached to the base material 202 at or above the top edge 240 of the opening 206 when the base material 202 is upright.

The opening 206 has a lower edge 242 when the base material 202 is in an upright position. In one embodiment, the retaining strap 204 is attached to the base material 202 above the lower edge 242 of the opening 206 at a distance from the bottom edge 242 of the opening 206 greater than one fourth of the vertical dimension of the butt 120 of the stock 102 of the gun 104 and less than the vertical dimension of the butt 120.

Referring to FIG. 5, in one embodiment, the gun stock retainer 200 also includes an installation strap 250. The installation strap has a first in 256 attached to the retaining strap 204 near an edge of the retaining strap approximately halfway between the first end and the second end of the retaining strap 204. In one embodiment, the installation strap 250 is inelastic. The installation strap 250 is operable to stretch the retaining strap 204 up, out, and onto the top 122 of the stock 102 when the installation strap 250 is pulled away from the base material 202 and the stock 102 is placed in the opening 206. The installation strap 250 also helps with removing stock 102 from the gun stock retainer 200 by giving the wearer a grip with which to pull the retaining strap 204. The installation strap 250 includes a fastener 252 near a second end of the installation strap 250 opposite the first end 256 of the installation strap 250. The fastener 252 releasably attaches the second end of the installation strap 252 a corresponding fastener 254 on the base material 202 above the opening 206. The corresponding fastener 254 on the base material 202 is above the opening 206 when the base material 202 is upright. In one embodiment, the fastener 252 corresponding fastener 254 are a snap button. A snap button may be advantageous for hunting equipment as opposed to a hook and loop fastener system due to reduced noise when releasing an attachment made by a snap button and the reduced possibility of inadvertently attaching the fastener 252 to the corresponding fastener 254.

In one embodiment, the base material 202 is backed by a portion of a hook and loop fastener system, and a corresponding portion of the hook and loop fastener system is attached to the garment 100 such that the gun stock retainer 200 is releasably attached to the garment 100. This may be useful if, for example, the garment 100 is a jacket or coat having a blaze orange color used for both deer hunting and upland bird hunting or a tactical vest, jacket, or coat for a sharpshooter or military personnel. It allows the wearer of the garment 100 to remove the gun stock retainer 200 from the garment 100 when upland bird hunting or entering a building, and reattach the gun stock retainer 200 when deer hunting or positioning for a sharpshooting assignment. It is also contemplated that the base material 2020 may be affixed to a garment 100 or shoulder strap of the garment 100 via one or more pin fasteners (e.g., name tag pin fasteners), one or more cinch straps, one or more hooks, one or more clips, or any combination thereof.

Although the gun stock retainer 200 is shown in use with the gun rest 300 operable to mount on a human knee, it is contemplated that the gun stock retainer 200 may be used with other gun rests such as bipods, shooting sticks, railings, logs, tree branches, or any other rest capable of supporting the fore-end 106 and/or barrel of the gun 104. Additionally, although the gun stock retainer 200 may be used with a gun stock 102 modified to improve its compatibility with the gun stock retainer 200, the gun stock retainer 200 works with original equipment, unmodified standard stocks for most shotguns, rifles, muzzle loaders, and breech loaders.

It is contemplated that the gun stock retainer 200 may be formed into, for example, a backpack, a vest, a shoulder strap, a jacket, a coat, a shoulder patch, or a shirt.

Figure 6:
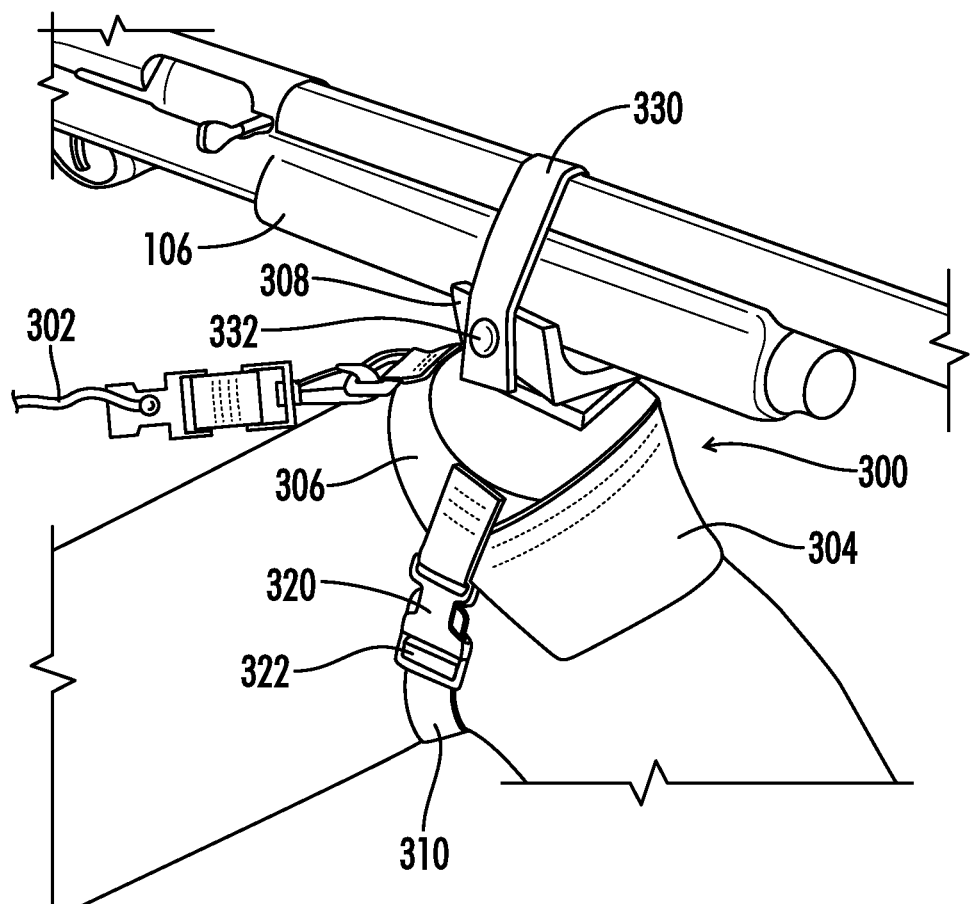
FIG. 6 is an elevated perspective view of a gun rest mounted on a wearer's knee with the gun rest holding a fore-end of a gun.
Figure 7:
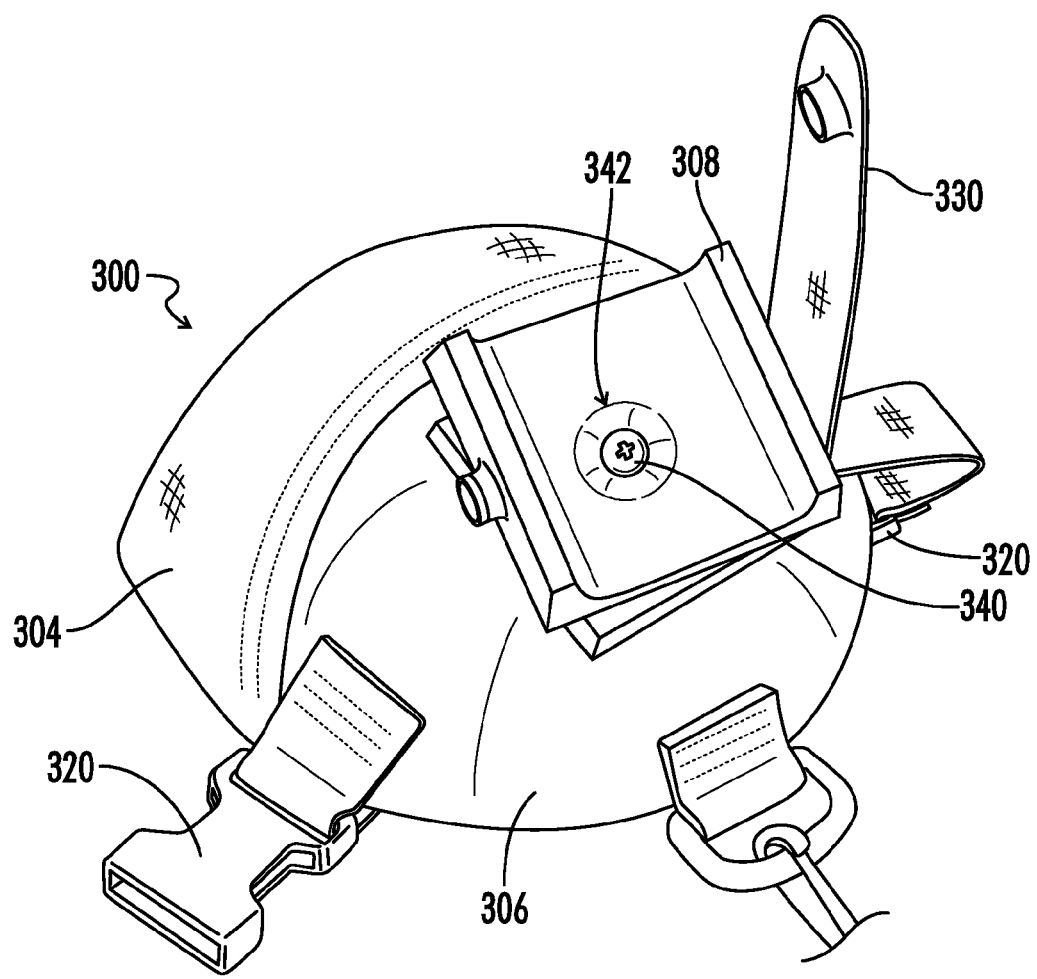
FIG. 7 is an elevated perspective view of a gun rest with a gun strap open to show a valley and recess of a cradle of the gun rest.

Referring to FIGS. 6 and 7, the gun rest 300 operable to mount on the human knee of the wearer and hold the fore-end 106 includes a knee cup 306, a knee strap 310, and a cradle 306. The knee cup 306 is generally shaped to conform to a front of the human knee such that the makeup 306 has a concave face operable to face the human knee and a second face operable to face out from the human knee. The second face is generally opposite the concave face with respect to position, but not necessarily in shape. In one embodiment, the second face of the knee cup 306 includes a 20° ramp such that the cradle 306 aligns with the fore-end 106 of the gun 104 when the stock 102 is in the gun stock retainer 200. The knee strap 310 is operable to attach to opposing edges (e.g., the sides) of the knee cup 306, pass behind the human knee, and hold the knee cup 306 to the front of the human knee. The cradle 308 is sized to receive the fore-end 106 and is affixed to the second face of the knee cup 306 near a center of the second face of the knee cup 306.

In one embodiment, the gun rest 300 also includes a knee strap fastener 320 and an adjuster 322. The knee strap fastener 320 releasably attaches the knee strap 310 to the knee cup 306. The adjuster 322 is operable to adjust an operating length of the knee strap 310. The operating length of the knee strap 310 is the length of the knee strap 310 passing behind the wearer's knee such that shortening the operating length via the adjuster 322 tightens the knee cup 306 on the front of the wearer's knee and lengthening the operating length via the adjuster 322 loosens the knee 306 on the front of the wearer's knee. In one embodiment, the knee strap is elastic which decreases or eliminates need for the adjuster 322.

In one embodiment, the gun rest 300 also includes a gun strap 330 operable to hold the fore-end 106 of the gun 104 in the cradle 308. The gun strap 330 includes a gun strap fastener 332 and affixed to the gun strap 330 near a first end of the gun strap 330. The gun strap fastener 332 is operable to releasably attach the first end of the gun strap to the cradle 308. A second end of the gun strap 330 opposite the first end of the gun strap 330 is attached or releasably attached to a second side of the cradle 308 opposite the first side of the cradle 308. In one embodiment, the knee cup 306 includes polyurethane rubber coated nylon. The nylon may be coated with the polyurethane rubber via calendaring.

In one embodiment, the cradle 308 is affixed to the knee cup 306 via a swivel joint such that the cradle 308 can rotate relative to the knee cup 306. Experimentation has shown that the swivel joint is preferable to a fixed joint because the swivel joint allows the wearer an improved range of motion and improves interoperability of the gun rest 300 between right-handed and left-handed shooters. The knee cup 306 includes a fitting having a threaded portion, and the fitting is made of metal (e.g., aluminum). The cradle 308 is attached to the knee cup 306 via a screw 340 recessed into a valley 342 of the cradle 308. The screw 340 engages the threaded portion of the fitting of the knee cup 306. The cradle 308 is interchangeable with a second cradle sized to fit another fore-end of another gun (e.g., the cradle 308 is sized for a 12 gauge fore-end while the second cradle is sized for a 0.410 fore-end). The cradle 308 is interchanged with the second cradle by uninstalling the screw 340 swapping the cradle 308 and the second cradle, and installing the screw 340 through the recess and the valley 342 of the second cradle into the fitting of the knee cup 306.

Figure 8:
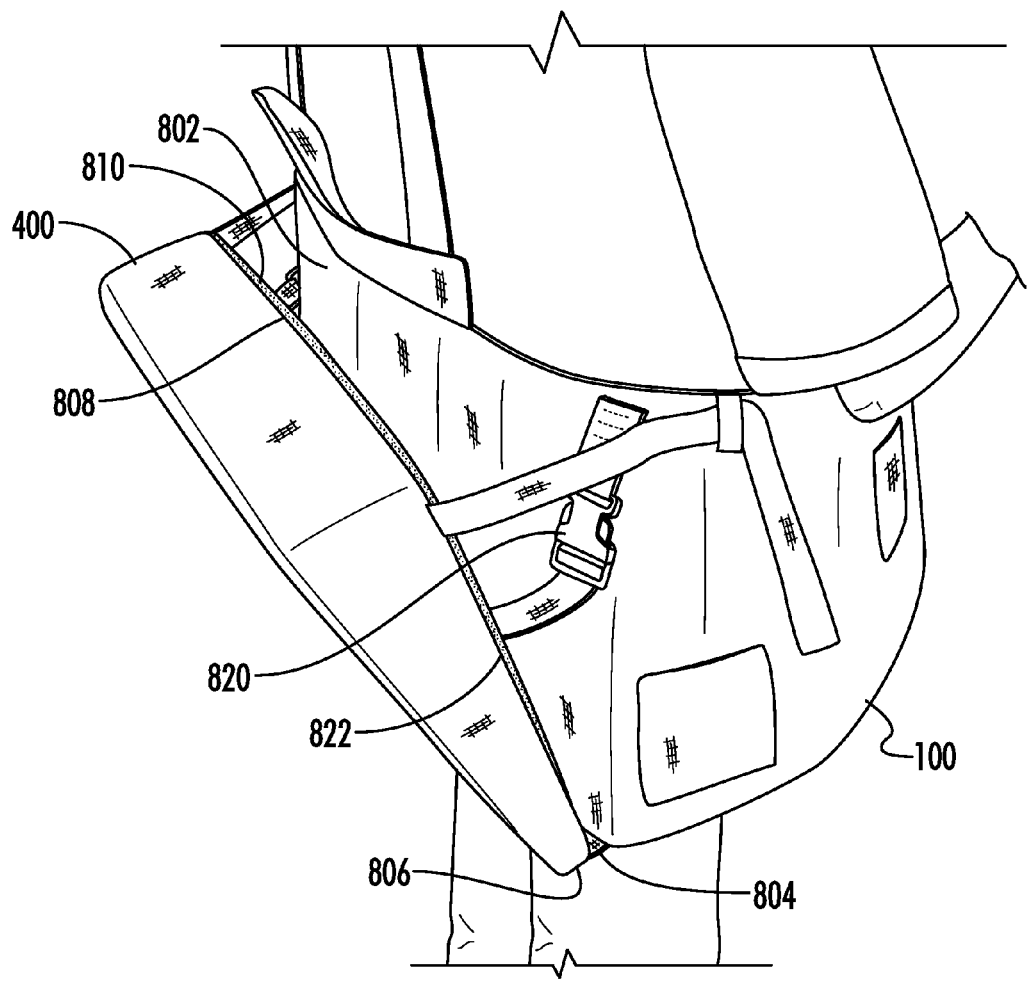
FIG. 8 is an elevated perspective rear view of a stowable, inclined seat pad of a garment.

Referring to FIG. 8, the garment 100 includes a back portion of fabric 802, a seat pad 400, and a hinge 804. The back portion of fabric 802 is near or below a waste of the wearer when the wearer is wearing the garment 100 in an upright, standing position. The seat pad 400 is generally wedge-shaped. The hinge 804 is between the back portion of fabric 802 and the seat pad 400. The hinge 804 is operable to attach a first edge 806 of the seat pad 400 to the back portion of fabric 802. The seat pad 400 is thinner at the first edge 806 than at a second edge 808 opposite the first edge 806.

In one embodiment, the hinge 804 includes a zipper such that the first edge 806 of the seat pad 400 is releasably attached to the back portion of fabric 802. In another embodiment, the hinge 804 includes a hook and loop fastener such that the first edge 806 of the seat pad 400 is releasably attached to the back portion of fabric 802 of the garment 100. In another embodiment, the back portion of fabric 802 is integral with a fabric of the seat pad 400 such that the hinge 804 is a fold in the fabric making up the back portion of fabric 802 and the fabric of the seat pad 400.

In one embodiment, the garment 100 also includes a first fastener portion (not visible) attached to the back portion of fabric 802 and a second fastener portion (not visible) attached to a first face 810 of the seat pad 400 near the second edge 808 of the seat pad 400. The first fastener portion engages the second fastener portion when the hinge 804 is in a closed position, and the first fastener portion and the second fastener portion cooperates to releasably attach the first face 810 of the seat pad 400 to the back portion of fabric 802. In one embodiment, the first fastener portion and the second fastener portion are magnetically attracted. In one embodiment, the first face of the seat pad 400 has a nonskid surface. The nonskid surface may be, for example, abrasive or textured rubber. The incline or wedge of the seat pad 400 and/or the nonskid surface cooperate to prevent the wearer of the garment 100 from sliding down the base of an inclined tree against which the wearer is leaning.

In one embodiment, the garment 100 includes at least one buckle 820 (e.g., a quick release buckle) attached to a third edge 822 of the first face 810 of the seat pad 400. The third edge 822 is adjacent to the first edge 806 and the second edge 808. The buckle 820 is attached to the third edge 822 near the second edge 808 then the first edge 806. The buckle 820 releasably attaches the seat pad 400 to the back portion of fabric 802 to maintain the hinge 804 and a closed position. When the wearer of the garment 100 is in a standing position and the first face 810 of the seat pad 400 is in contact with the back portion of fabric 802, the second edge 808 is above the first edge 806 of the seat pad 400. When the hinge 804 is in an open position, the seat pad 400 hangs from the back portion of fabric 802 such that the wearer may sit on the seat pad 400.

It is contemplated that the garment 100 may be, for example, a backpack, a vest, a shoulder strap, a jacket, a coat, a shoulder patch, or a shirt.

As used herein, releasably attached means attached via a fastener designed to easily unattached and reattach (e.g., by hand without a tool being necessary). Exemplary fasteners include a hook and ring, a hook and loop fastener system (e.g., Velcrco), a button snap, a button and buttonhole, a quick release buckle, and a buckle.

This description and appended claims include the words "below", "above", "top", "upper", "lower", "when", and "upright" to provide an orientation of embodiments of the invention to allow for proper description of example embodiments. It is contemplated that embodiments of the invention may be in orientations other than upright without departing from the spirit and scope of the invention as set forth in the appended claims. Further, it is contemplated that "above" means having an elevation greater than, and "below" means having an elevation less than such that one part need not be directly over or directly under another part to be within the scope of "above" or "below" as used herein. A Although embodiments of the present invention have been described in detail, it will be understood by those skilled in the art that various modifications can be made therein without departing from the spirit and scope of the invention as set forth in the appended claims.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention, it is not intended that such references be construed as limitations upon the scope of this invention except as set forth in the following claims.

What is claimed is:

1. A gun stock retainer operable to hold a stock of a gun, said gun stock retainer comprising:
a base material having an opening, wherein the opening is operable to receive a butt of the stock of the gun; and
a retaining strap comprising a nonslip material operable to contact the stock when the gun stock retainer is holding the stock, wherein the retaining strap is operable to engage a top of the stock of the gun and pull the butt of the stock into the opening when the gun stock retainer is holding the stock; wherein:
the opening has a first dimension and a second dimension;
the second dimension is substantially coplanar with and perpendicular to the first dimension;
the first dimension is substantially vertical and the second dimension is substantially horizontal when the base material is upright;
the first dimension is greater than the second dimension;
the first dimension is less than a vertical dimension of the butt of the stock of the gun when the gun is in an upright position;
the second dimension is equal to or greater than a horizontal dimension of the butt of the stock of the gun when the gun is in the upright position;
a first end of the retaining strap and a second end of the retaining strap are attached to the base material;
the first end of the retaining strap and the second end of the retaining strap are separated by a distance at least as great as a width of the opening;
the first dimension of the opening is between half and three fourths of a corresponding vertical dimension of the butt of the stock of the gun; and
the first and second ends of the retaining strap are attached to the base material at or below a top edge of the opening when the base material is upright.

2. The gun stock retainer of claim 1, wherein:
the base material comprises fabric;
the base material is part of a garment at a shoulder area of the garment; and
the shoulder area of the garment is the area of the garment that would be at a front of a shoulder of a wearer of the garment.

3. The gun stock retainer of claim 1, wherein the base material comprises a strap operable wrap around a shoulder strap of a garment and affix the base material to the garment.

4. The gun stock retainer of claim 1, wherein:
the nonslip material is a nonslip pad;
the retaining strap further comprises an elastic fabric;
the retaining strap comprises two sections of elastic cord attached to the nonslip pad near opposing sides of the nonslip pad; and
the nonslip pad is near a center of the elastic fabric such that the nonslip pad is operable to contact the stock when the gun stock retainer is holding the stock.

5. The gun stock retainer of claim 1, wherein a portion of an outline of the opening substantially matches a corresponding portion of an outline of the butt of the stock, and the portion of the outline of the opening excludes a top edge of the outline.

6. The gun stock retainer of claim 1, wherein:
the butt of the stock of the gun has a vertical dimension when in an upright position; and
the opening has a lower edge when the base material is in an upright position; and the retaining strap is attached to the base material above the lower edge of the opening at a distance from the bottom edge of the opening greater than one fourth of the vertical dimension of the butt of the stock of the gun and less than the vertical dimension of the butt of the stock of the gun when the base material is held in an upright position.

7. The gun stock retainer of claim 1, further comprising an installation strap having a first end attached to the retaining strap near an edge of the retaining strap approximately half way between a first end and a second end of the retaining strap, wherein:
   the installation strap is inelastic;
   the installation strap is operable to stretch the retaining strap up, out, and onto a top of the stock of the gun when pulled away from the base material and the stock of the gun is in the opening, and the gun and base material are upright; and
   the installation strap comprises a fastener near a second end of the installation strap opposite the first end of the installation strap for releasably attaching the second end of the installation strap to a corresponding fastener on the base material above the opening when the base material is upright.

8. A gun stock retainer operable to hold a stock of a gun, said gun stock retainer comprising:
   a base material having an opening, wherein the opening is operable to receive a butt of the stock of the gun; and
   a retaining strap comprising a nonslip material operable to contact the stock when the gun stock retainer is holding the stock, wherein the retaining strap is operable to engage a top of the stock of the gun and pull the butt of the stock into the opening when the gun stock retainer is holding the stock; wherein:
   the nonslip material is a nonslip pad;
   the retaining strap comprises two sections of elastic cord attached to the nonslip pad near opposing sides of the nonslip pad; and
   the nonslip pad is near a center of the elastic fabric such that the nonslip pad is operable to contact the stock when the gun stock retainer is holding the stock.

9. A gun stock retainer operable to hold a stock of a gun, said gun stock retainer comprising:
   a base material having an opening, wherein the opening is operable to receive a butt of the stock of the gun;
   a retaining strap comprising a nonslip material operable to contact the stock when the gun stock retainer is holding the stock, wherein the retaining strap is operable to engage a top of the stock of the gun and pull the butt of the stock into the opening when the gun stock retainer is holding the stock; and
   an installation strap having a first end attached to the retaining strap near an edge of the retaining strap approximately half way between a first end and a second end of the retaining strap, wherein:
   the installation strap is inelastic;
   the installation strap is operable to stretch the retaining strap up, out, and onto a top of the stock of the gun when pulled away from the base material and the stock of the gun is in the opening, and the gun and base material are upright; and
   the installation strap comprises a fastener near a second end of the installation strap opposite the first end of the installation strap for releasably attaching the second end of the installation strap to a corresponding fastener on the base material above the opening when the base material is upright.

\* \* \* \* \*